United States Patent [19]

Schad et al.

[11] Patent Number: 4,931,234
[45] Date of Patent: Jun. 5, 1990

[54] COINJECTION OF HOLLOW ARTICLES AND PREFORMS

[75] Inventors: Robert D. Schad, Toronto; Paul P. Brown, Orangeville, both of Canada

[73] Assignee: Husky Injection Molding Systems Ltd., Ontario, Canada

[21] Appl. No.: 306,568

[22] Filed: Feb. 6, 1989

Related U.S. Application Data

[60] Continuation of Ser. No. 72,767, Jul. 13, 1987, abandoned, which is a division of Ser. No. 862,269, May 12, 1986, Pat. No. 4,717,324.

[51] Int. Cl.$^5$ .................. B29C 45/02; B29C 45/16
[52] U.S. Cl. .................. 264/40.1; 264/255; 264/328.8; 264/328.15; 264/297.2; 425/130; 425/588
[58] Field of Search ............. 425/572, 573, 588, 549, 425/130, 120, 581; 264/513, 255, 297.2, 40.1, 40.6, 40.4, 328.8, 328.9, 328.14, 328.15

[56] References Cited

U.S. PATENT DOCUMENTS

| | | | |
|---|---|---|---|
| 3,973,892 | 8/1976 | Rees | 425/250 |
| 4,149,839 | 4/1979 | Iwawaki et al. | 425/133.1 |
| 4,315,724 | 2/1982 | Taoka et al. | 425/130 |
| 4,459,257 | 7/1984 | Baciu | 264/255 |
| 4,484,883 | 11/1984 | Honda et al. | 264/40.6 |

FOREIGN PATENT DOCUMENTS 51-25555  8/1974  Japan .................. 425/562

*Primary Examiner*—Jill L. Heitbrink
*Attorney, Agent, or Firm*—Bachman & LaPointe

[57] ABSTRACT

Method for coinjecting a plurality of thermoplastic materials to mold an article having a layered wall structure using thermoplastic material having different optimum processing temperatures including the maintenance of the optimum temperatures in flow paths individual to each material from its source to a mold cavity.

4 Claims, 2 Drawing Sheets

PET
— = 500-550°F
--- = 400-440°F
EVOH

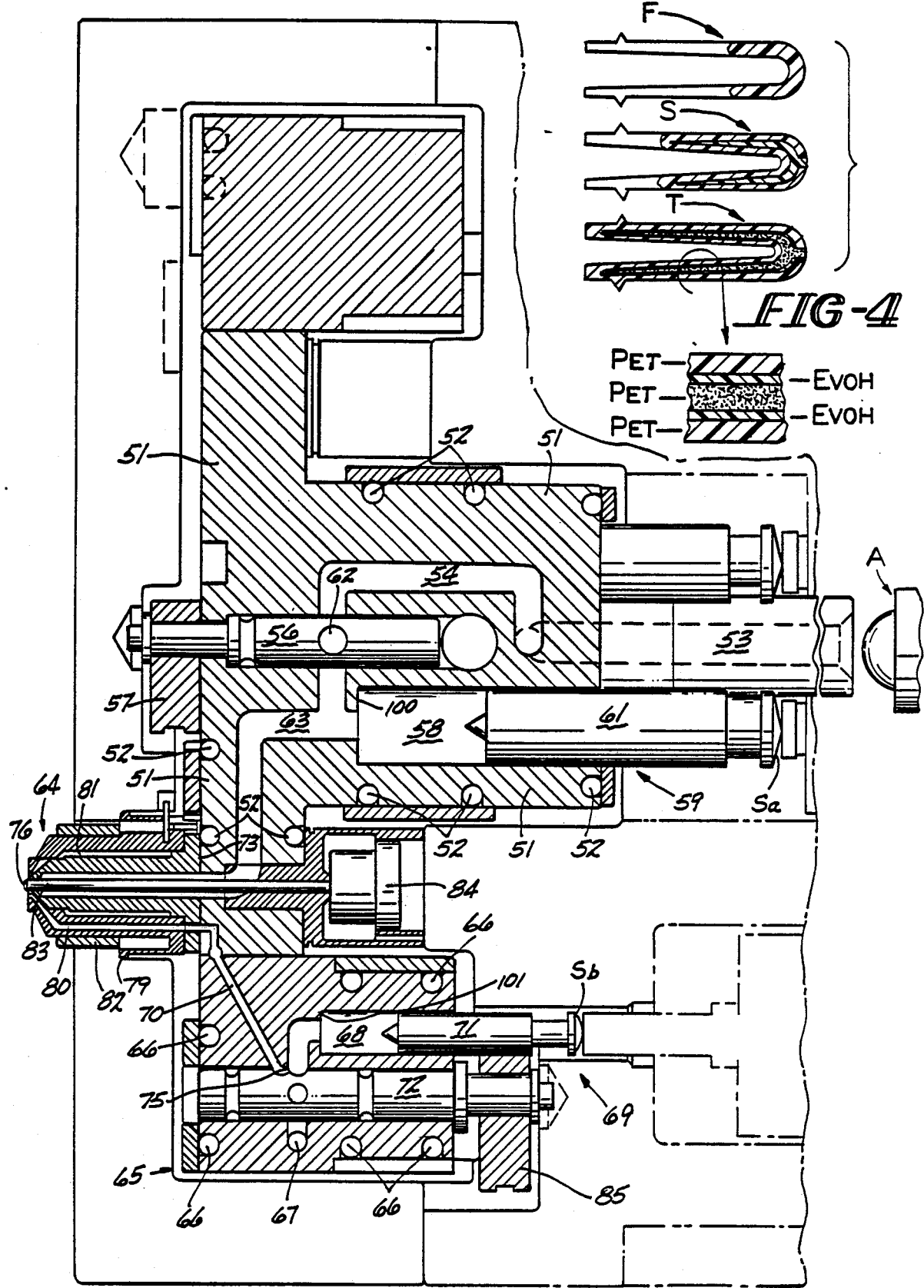

COINJECTION OF HOLLOW ARTICLES AND PREFORMS

CROSS REFERENCE TO RELATED APPLICATIONS

This application is a continuation of U.S. Ser. No. 072,767, filed July 13, 1987 now abandoned which in turn is a Division of U.S. Ser. No. 862,269, filed May 12, 1986 which has issued as U.S. Pat. No. 4,717,324 on Jan. 5, 1988.

FIELD OF INVENTION

The present invention relates to coinjection and relates in particular to an improved method and apparatus for molding hollow articles and preforms having a layered wall structure where the starting materials have substantially different optimum processing temperatures.

BACKGROUND OF THE INVENTION

The simultaneous or sequential injection (coinjection) of two or more resins into a mold cavity to develop layered wall structures is well known as evidenced by the disclosures of U.S. Pat. Nos. 4,497,621, 4,518,344, 4,525,134 and 4,526,821, all assigned to The American Can Company.

These disclosures, while providing separate flow paths for the respective resins, do not show or suggest a method for maintaining each resin at its optimum processing temperature during transit from an extruder or other source to the mold cavity.

The maintenance of processing temperatures of each individual resin is especially important when the optimum processing temperature of one resin causes degradation of a second resin or vice versa.

For example, it is frequently desirable to mold a layered wall structure for a hollow article or a preform where coinjected materials include ethylene vinyl alcohol copolymer (EVOH) which processes most satisfactorily at temperatures ranging from 400° to 440° F. and polyethylene terephthalate (PET) which processes best at temperatures ranging from 500° to 550° F. As stated previously, failure to maintain these optimum temperatures individually leads to degradation of one resin or the other resulting in defective product.

In prior art machines and processes numerous procedures have been devised to minimize the deleterious effect arising from resins having wide ranging and different processing temperatures.

Some procedures involve attempting to process the resins very quickly minimizing residence time and thus minimizing degradation.

Other procedures involve the use of resins that process at generally the same temperature range. Obviously, such a procedure limits the choice of resins and precludes their selection based upon desired barrier or other physical properties.

While the above coinjection methods and procedures are operable, it is highly desirable to enhance commercial success to provide coinjection molding machines and processes in which there is complete freedom to choose resin materials on the basis of their barrier characteristics even though the chosen resins process at different temperatures.

SUMMARY OF THE INVENTION

Consequently, it is a prime feature of the present invention to provide individual hot runner systems for each resin, from the resin source to the mold cavity, maintained and controlled independently at the temperature which is optimum for processing the selected resin to avoid overheating or freezing of the respective resins.

It is a further feature of the invention to provide a nozzle structure so constructed and arranged as to provide channels individual to each resin with individual heating means for maintaining each channel at a temperature which is most satisfactory for the resin progressing through the channel.

A further feature of the present invention is to provide a coinjection method and apparatus which lends itself ideally to molds having a large number of cavities, i.e. 16 and 32 cavity molds, for example.

A still further feature of the invention is the provision of "shooting pots" or injection cylinders individual to each resin channel.

A further feature of the invention is the provision of a spool valve or rotary valve which is mechanically actuated to control positively the loading of the shooting pots and to eliminate undesirable backflow in the hot runner system.

A further feature of the invention is the provision of a shooting pot and a cooperating spool valve assembly for each resin channel.

A method of molding layers of different thermoplastic material sequentially where each material requires a different processing temperature according to basic principles of the present invention may comprise the steps of providing individual sources of different thermoplastic materials each properly and individually conditioned for processing, providing a mold cavity, providing a hot runner system including conduits individual to each material leading from each source to the mold cavity and maintaining each material at the appropriate process temperature from its source to the mold cavity.

A coinjection molding apparatus illustrating certain other principles of the invention may comprise at least one mold cavity said cavity having a nozzle individual thereto, a hot runner system including conduit means for supplying at least two thermoplastic materials to said nozzle through individual channels, each material originating from a separate source and each material having different processing temperatures and heating means associated with the molding apparatus for maintaining each material at its appropriate temperature from its source through the hot runner system and through the nozzle to the mating mold cavity.

A nozzle structure embracing additional principles of the invention may comprise a gate for controlling admission of molding compound to an adjacent mold cavity, a plurality of independent channels within the nozzle each communicating with the gate, means for thermally insulating said channels from one another and heating means for maintaining said channels at different temperatures whereby thermoplastic resins of different optimum processing temperatures may be advanced without degradation.

Other features and advantages of the present invention will become more apparent from an examination of the succeeding specification when read in conjunction with the appending drawings, in which:

BRIEF DESCRIPTION OF THE DRAWINGS

FIG. 2 is a sectional view illustrating details of a hot runner-nozzle assembly individual to each mold cavity of FIG. 1, FIG. 4 is a series of sectional views of a molded article detailing the layered wall structure after the first, second, and third shots of resin.

DETAILED DESCRIPTION OF THE PREFERRED EMBODIMENT

Figure 1:
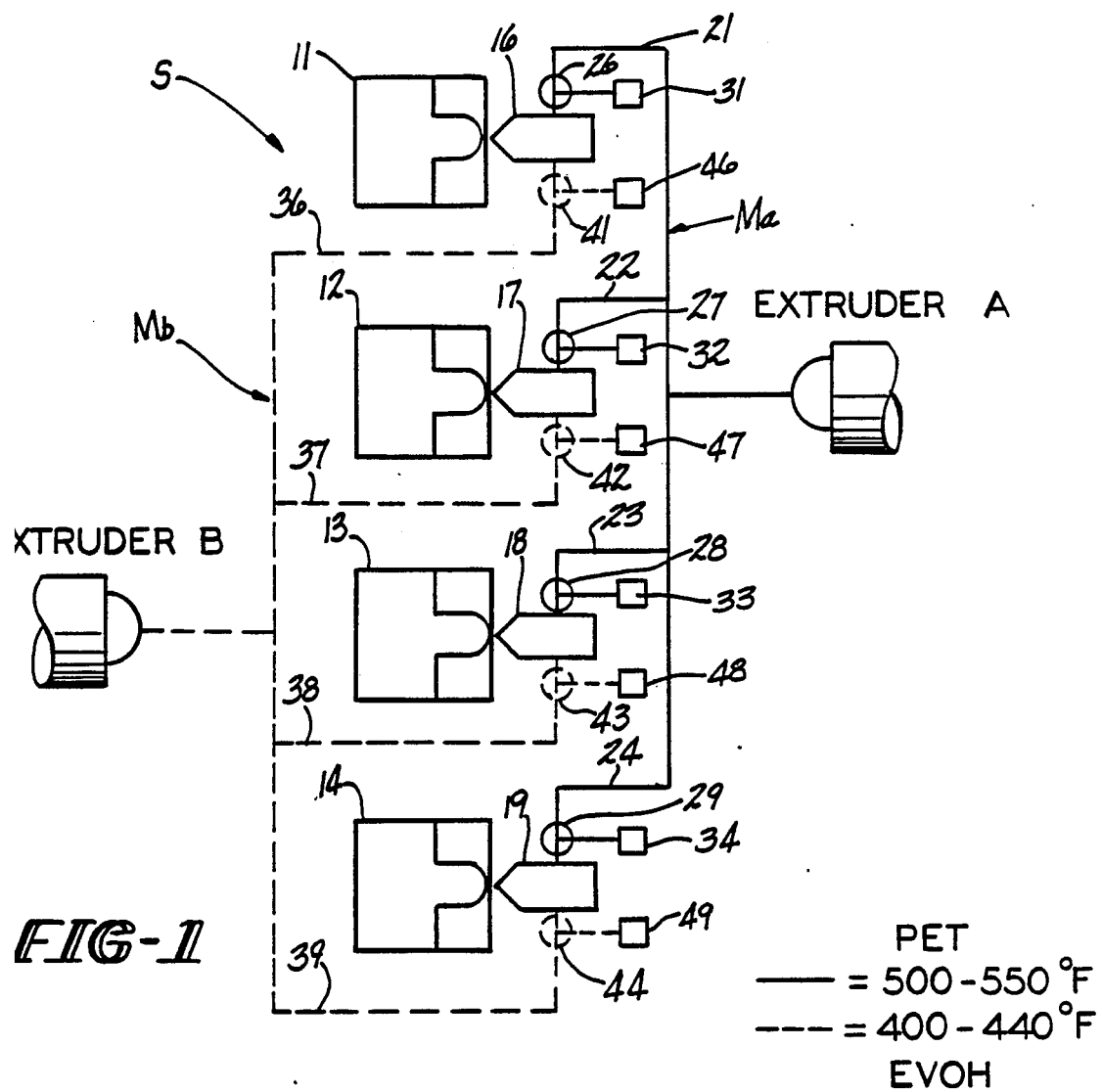
FIG. 1 is a schematic illustration of a hot runner system for a four cavity mold accommodating two thermoplastic resins each having different optimum processing temperatures and each maintained at its optimum temperature from its source through the coinjection nozzle.

Referring now in detail to the drawings, the illustration of FIG. 1 shows schematically a dual hot runner system S which accommodates two thermoplastic resins each having different optimum processing temperatures. One resin is provided from a source identified as extruder A and the other resin is provided from a source labeled extruder B.

While the present exemplary embodiment of the invention discloses two resin sources A and B, it is entirely within the spirit and scope of the invention to utilize more than two resin sources.

The portion of the hot runner system leading from extruder A is shown in solid lines and that portion of the system originating with extruder B is shown in dashed lines.

For purposes of convenient explanation of the invention, the legend of FIG. 1 indicates that the portion of the hot runner system connected to extruder A (solid lines) is maintained by suitable heaters in well-known fashion at a temperature ranging from 500° to 550° F., the optimum processing temperature for a thermoplastic resin such as PET. While the portion of the system connected to extruder B (dashed lines) is maintained at a temperature ranging from 400° to 440° F., the optimum processing temperature for a thermoplastic resin such as EVOH. It is to be noted that the resin selected and their optimum processing temperatures are merely exemplary of the present invention and their use in the present description is not intended to limit the invention to PET or to EVOH.

Referring further to FIG. 1, the reference numerals 11, 12, 13 and 14 designate four mold cavities each communicating with individual coinjection nozzles 16, 17, 18 and 19.

Extruder A supplies a heated manifold $M_a$ which, in turn, communicates with each nozzle via hot runners or channels 21, 22, 23 and 24, respectively. The reference numerals 26, 27, 28 and 29 designate spool valves which operate to control charging of shooting pots or injection cylinders 31, 32, 33 and 34.

Correspondingly, hot manifold $M_b$ leads from extruder B to each nozzle 16, 17, 18 and 19 via hot runners or channels 36, 37, 38 and 39. Spool valves 41, 42, 43 and 44 control charging of shooting pots 46, 47, 48 and 49.

While the schematic of FIG. 1 shows a hot runner system leading from two sources (extruders A and B) transporting conditioned thermoplastic resins to a four cavity mold, it is entirely within the scope and capability of the present invention to service as many as 16 to 48 cavities with resins originating from two or more sources.

FIG. 2 is a section of the hot runner system in the immediate vicinity of any one of the four nozzle-cavity assemblies of FIG. 1, i.e. cavity 11 and nozzle 16, for example.

A central manifold block 51 maintained at an operating temperature ranging from 500° to 550° F. by heating elements 52—52 receives plasticized resin from extruder A through channels 53 and 54. Spool valve or rotary valve 56, in circuit with channel 54 and operated (rotated) by link mechanism 57, controls the charging of reservoir 58 of the shooting pot or injection cylinder 59 equipped with an injection piston or charging piston 61. The spool valve 56 is formed with a transverse throughbore 62 and is shown in FIG. 2 in the closed position. The reservoir 58 communicates with channel 63 which leads to the nozzle assembly indicated generally by the reference numeral 64.

Heating elements 52—52 maintain the desired processing temperature of channel 63.

Heat conducted from manifold block 51 to a central portion of the nozzle assembly 64 maintains the integrity of the desired temperature range within the nozzle in a manner which will be described in more detail hereinafter.

A manifold segment 65 secured to manifold block 51 is heated by elements 66—66 to maintain optimum temperature (400° to 440° F.) in the hot runner connecting extruder B (not shown in FIG. 2) to channel 67 leading to the reservoir 68 of a second shooting pot 69 equipped with an injection or charging piston 71.

Here again, a spool valve 72 (shown in FIG. 2 in the closed position relative to channel 67) controls charging of the reservoir 68. In the closed position of the spool valve 72, the reservoir 68 communicates with the nozzle assembly 64 via channel 70 by virtue of cut-out 75. When the spool valve 72 is open the channel 70 is closed. Link mechanism 85 operates to rotate valve 72.

Figure 3:
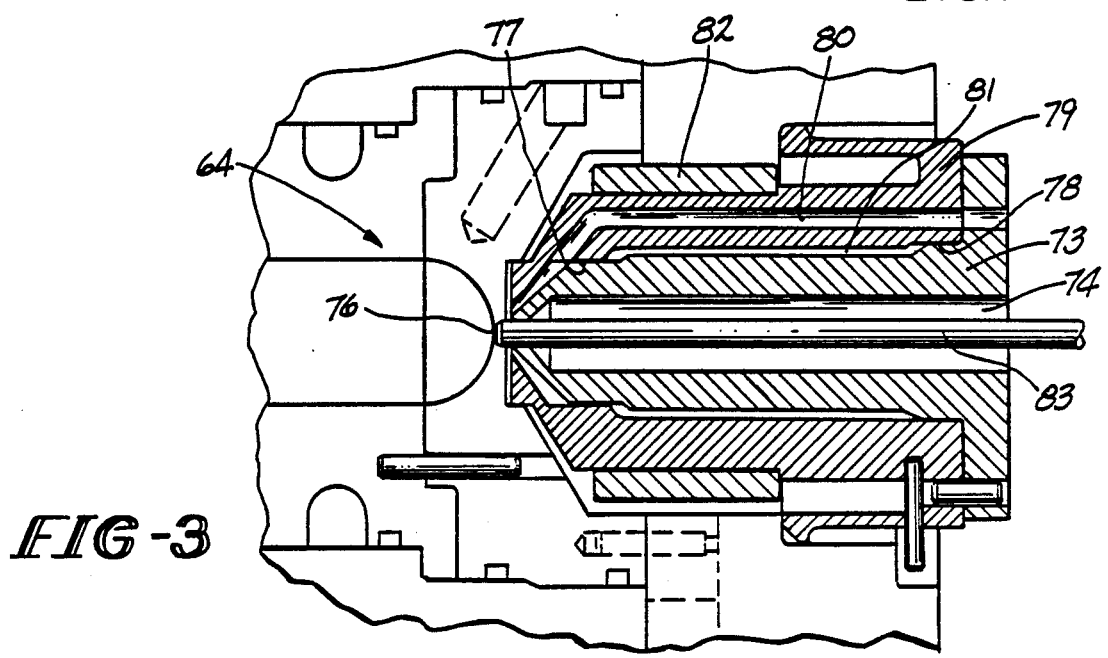
FIG. 3 is a sectional view showing details of the nozzle of FIG. 2, inverted.

Referring to FIG. 3 (inverted relative to the position of the nozzle in FIG. 2), note that the nozzle assembly 64 includes a central spigot 73 in thermal contact with manifold block 51 immediately adjacent local heating elements 52—52 as is most apparent in FIG. 2

The spigot 73, fabricated preferably of a good metallic thermal conductor such as beryllium copper, is formed with a through channel 74 through which PET flows to the nozzle gate 76.

The spigot is supported by minimal bearing surfaces 77-78 in a housing 79 which is spaced from the spigot substantially throughout its length by an insulating air gap 81. This air gap blocks conduction of heat (500° to 550° F.) from the spigot 73 to the housing 79 to preserve maintenance of the EVOH at its optimum process temperature (400° to 440° F.) controlled by heating means 82 as EVOH progresses through channel 80 of the housing to gate 76.

Thus, it is apparent that the hot runner system of the present invention is effective to maintain different optimum process temperatures appropriate to two different resins from the source of the resin to a nozzle gate.

OPERATION

A preferred method of operation will now be described.

To prime the hot runner system initially, extruders A and B including their cooperating shooting pots 59 and 69 are purged. Extruders A and B are moved into operative position relative to their respective manifolds. With valve stem 83 and spool valves 56 and 72 in the open position shooting pot reservoirs 58 and 68 are charged with PET and EVOH compound, respectively.

Next valve stem 83 is closed by piston and purged resin in the mold cavity is removed.

Thereafter the mold is closed and clamped, valve stem 83 is opened and an automatic sequence occurs as follows:

Spool valve 56 is closed and injection piston 61 is advanced until it bottoms at the point indicated by the reference numeral 100 discharging a measured amount of PET into the mold cavity through channel 63 and gate 76.

This constitutes the first shot of PET into the mold cavity as shown schematically at F in FIG. 4.

The piston 61 is held forward (in its bottomed position 100) blocking access to reservoir 58 to prevent backflow of PET compound from channel 63 into reservoir 58.

That is, the piston 61 is held bottomed to block access to reservoir 58 because upon subsequent operation of piston 71 to inject EVOH, the EVOH injection pressure has a tendency to displace PET from channel 63 back into reservoir 58.

Next spool valve 72 is closed to extruder B and opened to channel 70. Operation of injection piston 71 until it bottoms at 101 discharges a measured amount of EVOH into the cavity through channel 70 and gate 76.

This constitutes the first shot of EVOH into the mold cavity (second shot of resin) to develop a three (3) layered wall as shown schematically at S in FIG. 4. The volume of the first and second shots of resin is less than the total volume of the mold cavity.

Next channel 70 is closed by appropriate rotation of spool valve 72. Spool valve 56 is opened allowing the PET extruder A to complete the filing of the mold cavity and to pack the molded part while PET piston 61 remains bottomed blocking access to reservoir 58.

This step constitutes the second shot of PET (third shot of resin) to develop a five (5) layered wall as shown schematically at T in FIG. 4. Thus, a five (5) layered wall structure is molded using two (2) resins.

After packing is completed valve stem 83 is moved to closed position and piston 61 is freed to move. PET extruder A is operated to recharge reservoir 58 of shooting pot 59 displacing piston 61 until it contacts an injection stop Sa (FIG. 2). The position of the stop Sa controls and measures the amount of PET introduced into the reservoir 58.

In similar fashion the injection stop Sb (FIG. 2) controls and measures the amount of EVOH introduced into the EVOH reservoir 68.

During the course of packing the mold cavity (the part) the EVOH reservoir 68 is recharged by opening spool valve 72 to allow extruder B to displace EVOH piston 71 until the piston contacts its injection stop Sb thus charging EVOH reservoir 68 with a measured amount of EVOH compound.

After a suitable cooling interval, the mold is opened and the article is ejected by known means.

The above cycle is then repeated to generate additional layered articles or preforms in continuous, automatic fashion.

It is to be understood that the operation just described occurs simultaneously in all four mold cavities 11, 12, 13 and 14 of FIG. 1 or in any number of mold cavities as considerations of mold design and production requirements dictate.

It is to be understood further that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. In an injection molding machine including a multi-cavity mold where each cavity is fed by a coinjection nozzle having a plurality of insulated flow paths, said machine having means for controlling and measuring material flowing in each flow path, a method of molding layers of different thermoplastic materials in each mold cavity, layers of each material being molded individually and simultaneously in all cavities, said layers being molded in sequence into a multi-layered article, and at least one material having a substantially different process temperature, comprising the steps of:

providing individual sources of said different thermoplastic materials each properly and individually conditioned thermally for processing to avoid overheating or freezing, providing a mold with a plurality of cavities, selecting a number of individual and volumetrically precise quantities of a first material corresponding to the number of mold cavities, selecting a number of individual and volumetrically precise quantities of a second material corresponding to the number of mold cavities, the volumetric sum of the individual quantities of the first and second materials being less than the total volume of an individual cavity, feeding one precise quantity of said first material to each said mold cavity individually and simultaneously while said second material remains static, thereafter feeding one precise quantity of said second material to each said mold cavity individually and simultaneously while said first material remains static, and, thereafter feeding an additional quantity of said first material to each said mold cavity individually and simultaneously in order to pack or fill each mold cavity completely to create said multi-layered article, wherein each different material fed to each said mold cavity is measured and controlled individually.

2. The method of claim 1 plus the step of maintaining said materials conditioned thermally by feeding each material through said nozzle along said insulated flow paths.

3. The method of claim 1 in which the feeding steps are utilized to mold layers numbering at least twice the number of molding materials.

4. The method of claim 1 in which the selection of individual, volumetrically precise quantities are developed by utilizing metering means.

* * * * *